(12) United States Patent
Nappo

(10) Patent No.: US 6,318,740 B1
(45) Date of Patent: Nov. 20, 2001

(54) TOY WAGON AND COOLER COMBINATION

(76) Inventor: Donna R. Nappo, 28 Shari La., Delevan, NY (US) 14042

( * ) Notice: Subject to any disclaimer, the term of this patent is extended or adjusted under 35 U.S.C. 154(b) by 0 days.

(21) Appl. No.: 09/540,506

(22) Filed: Mar. 31, 2000

(51) Int. Cl.$^7$ .................................................. B62B 11/00
(52) U.S. Cl. .............................. 280/87.01; 280/47.35; 280/47.38; 62/457.7; 297/188.07; 297/245
(58) Field of Search .................... 297/188.04, 188.07, 297/245; 280/47.34, 47.35, 47.38, 47.4, 657, 658, 63, 87.021, 87.01, 30; 62/457.1, 457.7

(56) References Cited

U.S. PATENT DOCUMENTS

| | | | |
|---|---|---|---|
| D. 145,468 | * | 8/1946 | Spence ..................................... 280/30 |
| D. 347,407 | | 5/1994 | Dowell . |
| 1,473,161 | * | 11/1923 | Rogers ............................. 297/188.07 |
| 1,548,535 | * | 9/1925 | Lydecker ................................ 297/245 |
| 1,639,085 | * | 8/1927 | Fohey ................................ 297/188.04 |
| 2,950,924 | | 8/1960 | Gantz . |
| 3,963,262 | | 6/1976 | Estell . |
| 4,724,681 | | 2/1988 | Bartholomew et al. . |
| 4,735,426 | * | 4/1988 | McConnell ......................... 280/87.01 |
| 4,989,767 | | 2/1991 | Buschbom . |
| 5,100,198 | * | 3/1992 | Baltzell ................................ 297/192 |
| 5,538,267 | | 7/1996 | Pasin et al. . |
| 5,628,544 | * | 5/1997 | Goodman et al. ............... 297/188.14 |
| 5,884,795 | * | 3/1999 | Godbersen et al. ............. 297/188.07 |

OTHER PUBLICATIONS

Instruction manual from "Little Tikes" illustrating a "Deluxe 2–Door Wagon". Date unknown. The Little Tikes Company, PO Box 2277, Hudson, Ohio 44236–0877.

* cited by examiner

Primary Examiner—Michael Mar

(57) ABSTRACT

A toy wagon and cooler combination for carrying children passengers and storing items in a temperature moderated climate. The toy wagon and cooler combination includes a new toy wagon and cooler combination which includes a wagon body having a bottom wall, a front wall, a back wall, a first side wall. A pulling means is used for pulling the wagon body. A plurality of wheels is each rotatably coupled to the bottom wall of the wagon body. A first cooler extends into a top edge of the front wall. The first cooler has a lid thereon. The lid is hingedly coupled to the top edge of the front wall. The lid is adapted to selectively open and close the first cooler.

7 Claims, 2 Drawing Sheets

TOY WAGON AND COOLER COMBINATION

BACKGROUND OF THE INVENTION

1. Field of the Invention

The present invention relates to toy wagons and more particularly pertains to a new toy wagon and cooler combination for carrying children passengers and storing items in a temperature moderated climate.

2. Description of the Prior Art

The use of toy wagons is known in the prior art. More specifically, toy wagons heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,724,681; 5,538,267; 3,963,262; 2,950,924; 4,989,767; and U.S. Des. Pat. No. 347,407.

While these devices fulfill their respective, particular objectives and requirements, the aforementioned patents do not disclose a new toy wagon and cooler combination. The inventive device includes a wagon body having a bottom wall, a front wall, a back wall, a first side wall. A pulling means is used for pulling the wagon body. A plurality of wheels is each rotatably coupled to the bottom wall of the wagon body. A first cooler extends into a top edge of the front wall. The first cooler has a lid thereon. The lid is hingedly coupled to the top edge of the front wall. The lid is adapted to selectively open and close the first cooler.

In these respects, the toy wagon and cooler combination according to the present invention substantially departs from the conventional concepts and designs of the prior art, and in so doing provides an apparatus primarily developed for the purpose of carrying children passengers and storing items in a temperature moderated climate.

SUMMARY OF THE INVENTION

In view of the foregoing disadvantages inherent in the known types of toy wagons now present in the prior art, the present invention provides a new toy wagon and cooler combination construction wherein the same can be utilized for carrying children passengers and storing items in a temperature moderated climate.

The general purpose of the present invention, which will be described subsequently in greater detail, is to provide a new toy wagon and cooler combination apparatus and method which has many of the advantages of the toy wagons mentioned heretofore and many novel features that result in a new toy wagon and cooler combination which is not anticipated, rendered obvious, suggested, or even implied by any of the prior art toy wagons, either alone or in any combination thereof.

To attain this, the present invention generally comprises a wagon body having a bottom wall, a front wall, a back wall, a first side wall. A pulling means is used for pulling the wagon body. A plurality of wheels is each rotatably coupled to the bottom wall of the wagon body. A first cooler extends into a top edge of the front wall. The first cooler has a lid thereon. The lid is hingedly coupled to the top edge of the front wall. The lid is adapted to selectively open and close the first cooler.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new toy wagon and cooler combination apparatus and method which has many of the advantages of the toy wagons mentioned heretofore and many novel features that result in a new toy wagon and cooler combination which is not anticipated, rendered obvious, suggested, or even implied by any of the prior art toy wagons, either alone or in any combination thereof.

It is another object of the present invention to provide a new toy wagon and cooler combination which may be easily and efficiently manufactured and marketed.

It is a further object of the present invention to provide a new toy wagon and cooler combination which is of a durable and reliable construction.

An even further object of the present invention is to provide a new toy wagon and cooler combination which is susceptible of a low cost of manufacture with regard to both materials and labor, and which accordingly is then susceptible of low prices of sale to the consuming public, thereby making such toy wagon and cooler combination economically available to the buying public.

Still yet another object of the present invention is to provide a new toy wagon and cooler combination which provides in the apparatuses and methods of the prior art some of the advantages thereof, while simultaneously overcoming some of the disadvantages normally associated therewith.

Still another object of the present invention is to provide a new toy wagon and cooler combination for carrying children passengers and storing items in a temperature moderated climate.

Yet another object of the present invention is to provide a new toy wagon and cooler combination which includes a wagon body having a bottom wall, a front wall, a back wall, a first side wall. A pulling means is used for pulling the wagon body. A plurality of wheels is each rotatably coupled to the bottom wall of the wagon body. A first cooler extends into a top edge of the front wall. The first cooler has a lid thereon. The lid is hingedly coupled to the top edge of the front wall. The lid is adapted to selectively open and close the first cooler.

Still yet another object of the present invention is to provide a new toy wagon and cooler combination that contains two coolers for storage of multiple items.

Even still another object of the present invention is to provide a new toy wagon and cooler combination that has seating therein for two occupants and contains a storage compartment separate from the coolers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
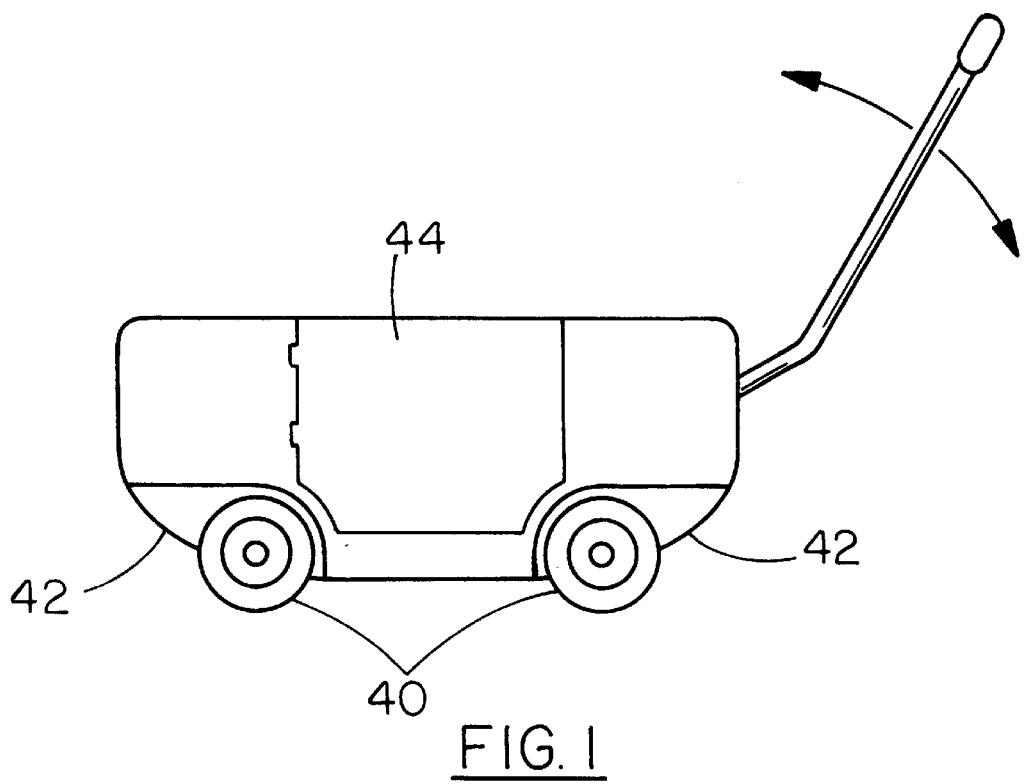
FIG. 1 is a schematic side view of a new toy wagon and cooler combination according to the present invention.
Figure 2:
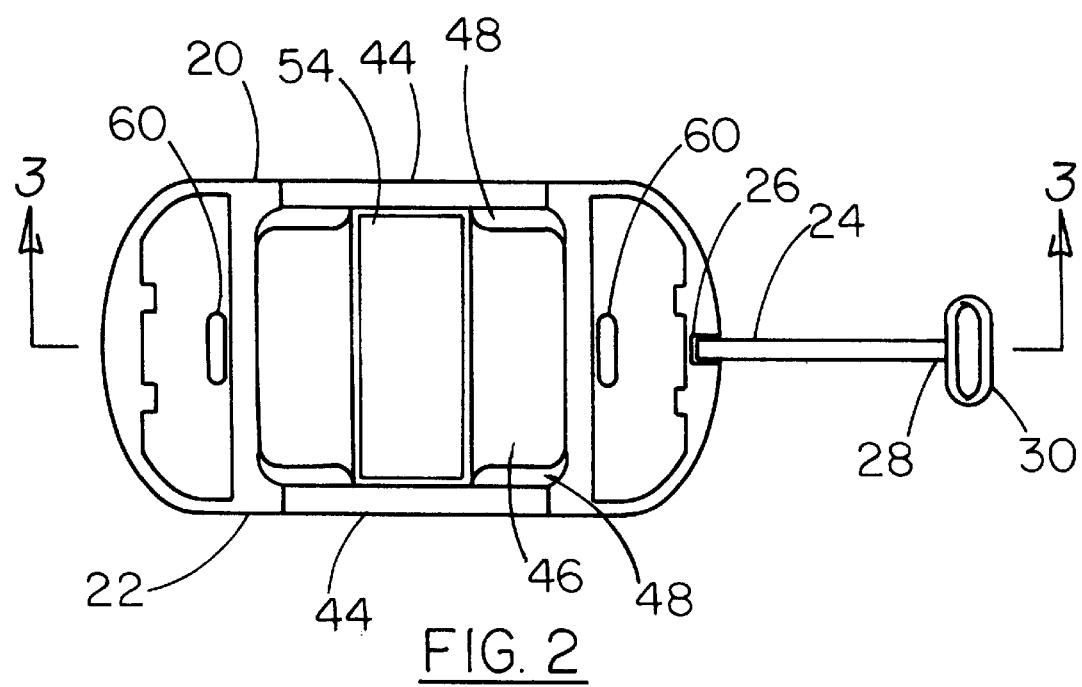
FIG. 2 is a schematic plan view of the present invention.
Figure 3:
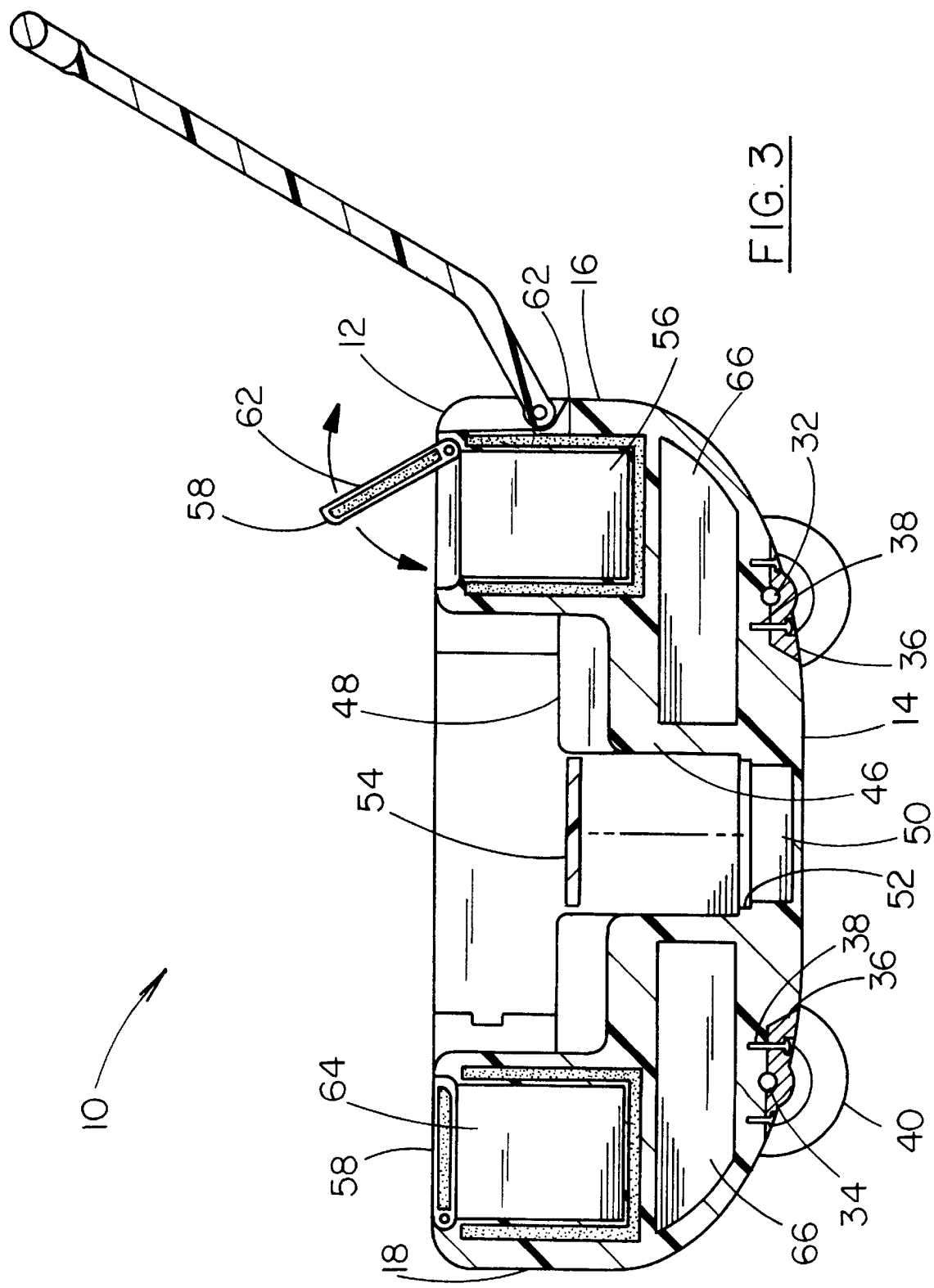
FIG. 3 is a schematic cross-sectional view taken along line 3—3 of the present invention.

With reference now to the drawings, and in particular to FIGS. 1 through 3 thereof, a new toy wagon and cooler combination embodying the principles and concepts of the present invention and generally designated by the reference numeral 10 will be described.

As best illustrated in FIGS. 1 through 3, the toy wagon and cooler combination 10 generally comprises a wagon body 12 having a bottom wall 14, a front wall 16, a back wall 18, a first side wall 20, a second side wall 22. A passenger compartment is defined within the walls.

A pulling means 24 is used for pulling the wagon body 12. The pulling means 24 is elongate and has a first end 26 and a second end 28. The first end 26 is pivotally coupled to an outside surface of the front wall 16. The second end 28 has a handle 30 fixedly coupled thereto.

A first axle 32 and a second axle 34 are coupled to a bottom surface of the bottom wall 14 by brackets 36 and fasteners 38. The first axle 32 is generally located at a juncture defined by the bottom wall 14 and the front wall 16. The second axle 34 is generally located at a juncture defined by the bottom wall 14 and the back wall 18. The first 32 and second axles 34 each has a longitudinal axis orientated generally perpendicular to a plane of the first side wall 20.

Each of a plurality of wheels 40 is rotatably coupled to an end of the first 32 and second 34 axles. Each of the wheels 40 is placed in indentations 42 in the wagon body 12. The indentations 42 define wheel wells.

Each of a pair of doors 44 is hingedly coupled to one of the side walls 20, 22. Each of the doors 44 is selectively movable between an open and a closed position.

A pair of seats 46 each comprises a block. Each of the blocks is integrally coupled to one of the front 16 and back walls 18. Each of the blocks is integrally coupled to the bottom wall 14. The blocks are spaced from each other. Each of the seats 46 has a pair of arm rest blocks 48 for supporting the arms of the passengers. Each of the arm rest blocks 48 is integrally coupled to a top surface of the seats 46 and to one of the first 20 and second 22 side walls such that there is one arm rest 48 on either side of the seats 46.

A compartment 50 comprises a well extending into the top surface of the bottom wall 14. The compartment 50 is generally located between the seats 46. The compartment 50 has a top edge having shoulder 52 therein. A cover 54 for the compartment 50 has a shape adapted to rest on the shoulder 52. The cover 54 may be selectively removed from the compartment 50.

A first cooler 56 extends into a top edge of the front wall 16. The first cooler 56 has a lid 58 thereon. The lid 58 is hingedly coupled to the top edge of the front wall 16. The lid 58 is adapted to selectively open and close the first cooler 56. The lid 58 has a groove 60 therein such that the groove 60 defines a handle. The first cooler 56 has walls having conventional insulation 62 therein. The lid 58 also has insulation 62 therein.

A second cooler 64 extends into a top edge of the back wall 18. The second cooler 64 has a lid 58 thereon. The lid 58 is hingedly coupled to the top edge of the back wall 18. The lid 58 is adapted to selectively open and close the second cooler 64. The lid 58 has a groove 60 therein such that the groove defines a handle. The second cooler 64 has walls having conventional insulation 62 therein. The lid also has insulation therein.

In use, the wagon is generally used as is any child's wagon. Ideally, the wagon comes with two fully functional coolers 56, 64 which may keep items hot or cool when placed therein. The additional compartment 50 in the bottom wall serves another storage area. Preferably, the wagon body 12 is hollow in the areas between the seat and bottom wall. The hollow areas 66 allow for a lighter design.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A toy wagon and cooler apparatus, said apparatus, comprising:

a wagon body having a bottom wall, a front wall, a back wall, a first side wall;

a pulling means for pulling said wagon body;

a plurality of wheels, each of said wheels being rotatably coupled to said bottom wall of said wagon body;

a first cooler, said first cooler extending into a top edge of said front wall, said first cooler having a lid thereon, said lid being hingedly coupled to said top edge of said front wall, said lid being adapted to selectively open and close said first cooler;

a second cooler, said second cooler extending into a top edge of said back wall, said second cooler having a lid thereon, said lid being hingedly coupled to said top edge of said back wall, said lid being adapted to selectively open and close said second cooler;

a compartment, said compartment being a well extending into said top surface of said bottom wall, said compartment being generally located between said seats, said compartment having a top edge having shoulder therein, a cover for said compartment having a shape adapted to rest on said shoulder, wherein said cover may be selectively removed from said compartment; and a pair of seats, each of said seats being a block, each of said blocks being integrally coupled to one of said front and back walls, each of said blocks being integrally coupled to said bottom wall, said blocks being spaced from each other, each of said seats having a pair of arm rest blocks, each of said arm rest blocks being integrally coupled to a top surface of said seats and to one of said first and second side walls such that there is one arm rest one either side of said seats.

2. The toy wagon and cooler apparatus as in claim 1, wherein said pulling means comprises:

said pulling means being elongate and having a first and second end, said first end being pivotally coupled to an outside surface of said front wall, said second end having a handle fixedly coupled thereto.

3. The toy wagon and cooler apparatus as in claim 1, further comprising:

a first axle and a second axle being coupled to a bottom surface of said bottom wall, said first axle being generally located at a juncture defined by said bottom wall and said front wall, said second axle being generally located at a juncture defined by said bottom wall and said back wall, said first and second axles each having a longitudinal axis orientated generally perpendicular to a plane of said first side wall; and wherein each of said wheels being rotatably coupled to an end of said first and second axles.

4. The toy wagon and cooler apparatus as in claim 1, further comprising:

each of said wheels being placed in indentations in said wagon body, said indentations defining wheel wells.

5. The toy wagon and cooler apparatus as in claim 1, further comprising:

a pair of doors, each of said doors being hingedly coupled to one of said side walls, each of said doors being selectively movable between an open and a closed position.

6. A toy wagon and cooler apparatus, said apparatus comprising:

a wagon body having a bottom wall, a front wall, a back wall, a first side wall, a second side wall, a passenger compartment being defined within said walls, each of said front and back walls being formed with an exterior surface and an interior surface;

a pulling means for pulling said wagon body, said pulling means being elongate and having a first and second end, said first end being pivotally coupled to an outside surface of said front wall, said second end having a handle fixedly coupled thereto;

a first axle and a second axle being coupled to a bottom surface of said bottom wall, said first axle being generally located at a juncture defined by said bottom wall and said front wall, said second axle being generally located at a juncture defined by said bottom wall and said back wall, said first and second axles each having a longitudinal axis orientated generally perpendicular to a plane of said first side wall;

a plurality of wheels, each of said wheels being rotatably coupled to an end of said first and second axles, each of said wheels being placed in indentations in said wagon body, said indentations defining wheel wells;

a pair of doors, each of said doors being hingedly coupled to one of said side walls, each of said doors being selectively movable between an open and a closed position;

a pair of seats, each of said seats being a block, each of said blocks being integrally coupled to one of said front and back walls, each of said blocks being integrally coupled to said bottom wall, said blocks being spaced from each other, each of said seats having a pair of arm rest blocks, each of said arm rest blocks being integrally coupled to a top surface of said seats and to one of said first and second side walls such that there is one arm rest on either side of said seats, said interior surfaces of said front and back walls forming a backrest for said pair of seats;

a compartment, said compartment being a well extending into said top surface of said bottom wall, said compartment being generally located between said seats, said compartment having a top edge with a shoulder formed therein, a cover for said compartment having a shape adapted to rest on said shoulder, wherein said cover may be selectively removed from said compartment;

a first cooler, said first cooler extending into a top edge of said front wall, said first cooler having a lid thereon, said lid being hingedly coupled to said top edge of said front wall, said lid being adapted to selectively open and close said first cooler, said lid having a groove therein such that said groove defines a handle, said first cooler having walls having insulation therein, said lid having insulation therein; and a second cooler, said second cooler extending into a top edge of said back wall, said second cooler having a lid thereon, said lid being hingedly coupled to said top edge of said back wall, said lid being adapted to selectively open and close said second cooler, said lid having a groove therein such that said groove defines a handle, said second cooler having walls having insulation therein, said lid having insulation therein.

7. A toy wagon and cooler apparatus, said apparatus comprising:

a wagon body having a bottom wall, a front wall, a back wall, a first side wall, a second side wall, a passenger compartment being defined within said walls, each of said front and back walls being formed with an exterior surface and an interior surface;

a pulling means for pulling said wagon body, said pulling means being elongate and having a first and second end, said first end being pivotally coupled to an outside surface of said front wall, said second end having a handle fixedly coupled thereto;

a first axle and a second axle being coupled to a bottom surface of said bottom wall, said first axle being generally located at a juncture defined by said bottom wall and said front wall, said second axle being generally located at a juncture defined by said bottom wall and said back wall, said first and second axles each having a longitudinal axis orientated generally perpendicular to a plane of said first side wall;

a plurality of wheels, each of said wheels being rotatably coupled to an end of said first and second axles, each of said wheels being placed in indentations in said wagon body, said indentations defining wheel wells;

a pair of doors, each of said doors being hingedly coupled to one of said side walls, each of said doors being selectively movable between an open and a closed position;

a pair of seats, each of said seats being a block, each of said blocks being integrally coupled to one of said front and back walls, each of said blocks being integrally coupled to said bottom wall, said blocks being spaced from each other, said interior surfaces of said front and back walls forming a backrest for said pair of seats;

a compartment, said compartment being a well extending into said top surface of said bottom wall, said compartment being generally located between said seats, said compartment having a top edge with a shoulder formed therein;

a first cooler, said first cooler extending into a top edge of said front wall, said first cooler having a lid thereon, said lid being hingedly coupled to said top edge of said front wall, said lid being adapted to selectively open and close said first cooler, said first cooler having walls having insulation therein, said lid having insulation therein; and a second cooler, said second cooler extending into a top edge of said back wall, said second cooler having a lid thereon, said lid being hingedly coupled to said top edge of said back wall, said lid being adapted to selectively open and close said second cooler, said second cooler having walls having insulation therein, said lid having insulation therein.

* * * * *